United States Patent
Tanihara et al.

(10) Patent No.: US 10,297,815 B2
(45) Date of Patent: May 21, 2019

(54) METHOD FOR PRODUCING ELECTRODE FOR LITHIUM ION SECONDARY BATTERIES

(71) Applicant: ZEON CORPORATION, Chiyoda-ku, Tokyo (JP)

(72) Inventors: Koichi Tanihara, Miyoshi (JP);
Yasuhiro Sakashita, Nisshin (JP);
Yuya Kitagawa, Yokohama (JP);
Hiroyuki Sekine, Yokohama (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 15/539,294

(22) PCT Filed: Nov. 10, 2015

(86) PCT No.: PCT/JP2015/081649
§ 371 (c)(1),
(2) Date: Jun. 23, 2017

(87) PCT Pub. No.: WO2016/103939
PCT Pub. Date: Jun. 30, 2016

(65) Prior Publication Data
US 2018/0159114 A1    Jun. 7, 2018

(30) Foreign Application Priority Data

Dec. 25, 2014    (JP) .................................. 2014-263402

(51) Int. Cl.
H01M 4/04     (2006.01)
H01M 4/13     (2010.01)
(Continued)

(52) U.S. Cl.
CPC ......... *H01M 4/0404* (2013.01); *H01M 4/139* (2013.01); *H01M 4/62* (2013.01); *H01M 4/622* (2013.01); *H01M 10/0525* (2013.01)

(58) Field of Classification Search
None
See application file for complete search history.

(56) References Cited

U.S. PATENT DOCUMENTS

2013/0004843 A1    1/2013   Suzuki et al.
2014/0079872 A1    3/2014   Uchida et al.

FOREIGN PATENT DOCUMENTS

JP    2006054115 A    2/2006
JP    2014078497 A    5/2014
(Continued)

OTHER PUBLICATIONS

Dec. 8, 2015, International Search Report issued in the International Patent Application No. PCT/JP2015/081649.
(Continued)

*Primary Examiner* — Daniel S Gatewood
(74) *Attorney, Agent, or Firm* — Kenja IP Law PC

(57) ABSTRACT

A method for producing an electrode for lithium ion secondary batteries proposed herein includes: a step of forming a binder coat layer 16 on a collector 12, with the binder coat layer 16 being formed so as to have a large coat amount region 18A of relatively a large coating amount and a small coat amount region 18B of relatively small coating amount, and the large coat amount region 18A being provided at both side edge portions 16E of the binder coat layer 16; a step of supplying granulated particles containing active material particles and a binder, onto the binder coat layer 16; and a step of forming an active material layer by pressing of aggregates of the granulated particles.

3 Claims, 8 Drawing Sheets

(51) Int. Cl.
*H01M 4/139* (2010.01)
*H01M 4/62* (2006.01)
*H01M 10/0525* (2010.01)

(56) References Cited

FOREIGN PATENT DOCUMENTS

| | | | |
|---|---|---|---|
| JP | 2014199738 A | * | 10/2014 |
| JP | 2014199738 A | | 10/2014 |
| JP | 2016031783 A | | 3/2016 |
| JP | 2016071955 A | | 5/2016 |
| JP | 2016071956 A | | 5/2016 |
| KR | 1020140037783 A | | 3/2014 |

OTHER PUBLICATIONS

Jul. 31, 2018, the Extended European Search Report issued by the European Patent Office in the corresponding European Patent Application No. 15872508.5.

* cited by examiner

METHOD FOR PRODUCING ELECTRODE FOR LITHIUM ION SECONDARY BATTERIES

TECHNICAL FIELD

The present invention relates to a method for producing an electrode for lithium ion secondary batteries.

The present international application claims priority on the basis of Japanese Patent Application No. 2014-263402 filed on Dec. 25, 2014, the entire contents whereof have been incorporated into the present application by reference.

BACKGROUND ART

Electrodes used in lithium ion secondary batteries are typically provided with an active material layer, containing an active material, on a collector. The active material layer is produced generally by coating the surface of a collector with a slurry-like composition resulting from dispersing an active material in a liquid medium, and by drying the whole, followed by pressing. Methods are also known that involve producing an electrode by powder molding, without using a liquid medium. For instance, Patent Literature 1 discloses an electrode production method that involves coating an elongate collector with a binder coating solution, along the longitudinal direction; depositing thereafter, onto the coated collector, a powder of granulated particles resulting from granulation of active material particles and a binder; and forming an active material layer through pressure molding (pressing).

CITATION LIST

Patent Literature

Patent Literature 1: Japanese Patent Application Publication No. 2014-078497

SUMMARY OF INVENTION

Technical Problem

In the electrode production method disclosed in Patent Literature 1, however, the pressure at the time of the above pressure molding dissipates by escaping in the lateral direction at the edge portions of the active material layer, as a result of which pressure molding may become insufficient. As a result, a problem may arise in that bonding strength at the edge portions of the active material layer becomes relatively low, so that when stress acts on the electrode in a subsequent battery production process, the edge portions may be prone to peeling and the active material prone to slipping down (particle fall-off). The active material that slips down as foreign matter into the electrolyte solution may give rise to short-circuits within the battery. It is an object of the present invention, arrived at with a view to solving the above problems, to provide a method for producing an electrode for lithium ion secondary batteries in which peeling at edge portions of an active material layer and slip-down (particle fall-off) of the active material are suppressed.

Solution to Problem

The method for producing an electrode for lithium ion secondary batteries proposed herein includes a step of forming a binder coat layer through application of a binder liquid containing a binder and a solvent, onto an elongate collector, along the longitudinal direction of the collector. Herein, the binder coat layer is formed so as to have a large coat amount region in which the coating amount of the binder liquid per unit surface area is relatively large and a small coat amount region in which the coating amount is relatively small, in a width direction of the collector perpendicular to the longitudinal direction of the latter. The large coat amount region is provided at least at both side edge portions of the binder coat layer in the width direction. The production method includes a step of supplying granulated particles containing active material particles and a binder, onto the binder coat layer. Further, the method includes a step of forming an active material layer through pressing of aggregates of the granulated particles having been supplied onto the binder coat layer. Such a production method allows suppressing peeling and slip-down (particle fall-off) of active material at the edge portions of the active material layer after pressing.

In a preferred aspect of the production method disclosed herein further has a step of, after formation of the active material layer, cutting the active material layer and the collector along the longitudinal direction, at a central portion in the width direction. In this case the large coat amount region of the binder coat layer may be provided at a cutting site intended for cutting in the cutting step. It becomes thus possible to suppress the occurrence of peeling and of slip-down (particle fall-off) of an active material at the cutting site during cutting.

In a preferred aspect of the production method disclosed herein, the binder coat layer is formed intermittently on the collector in such a manner that line-like coated sections resulting from coating with the binder liquid and line-like uncoated sections not coated with the binder liquid are alternately adjacent to each other. In such a configuration, the granulated particles and the collector are in direct contact across the uncoated section, and conductivity between the granulated particles and the collector can be enhanced as a result.

DESCRIPTION OF EMBODIMENTS

Figure 1:
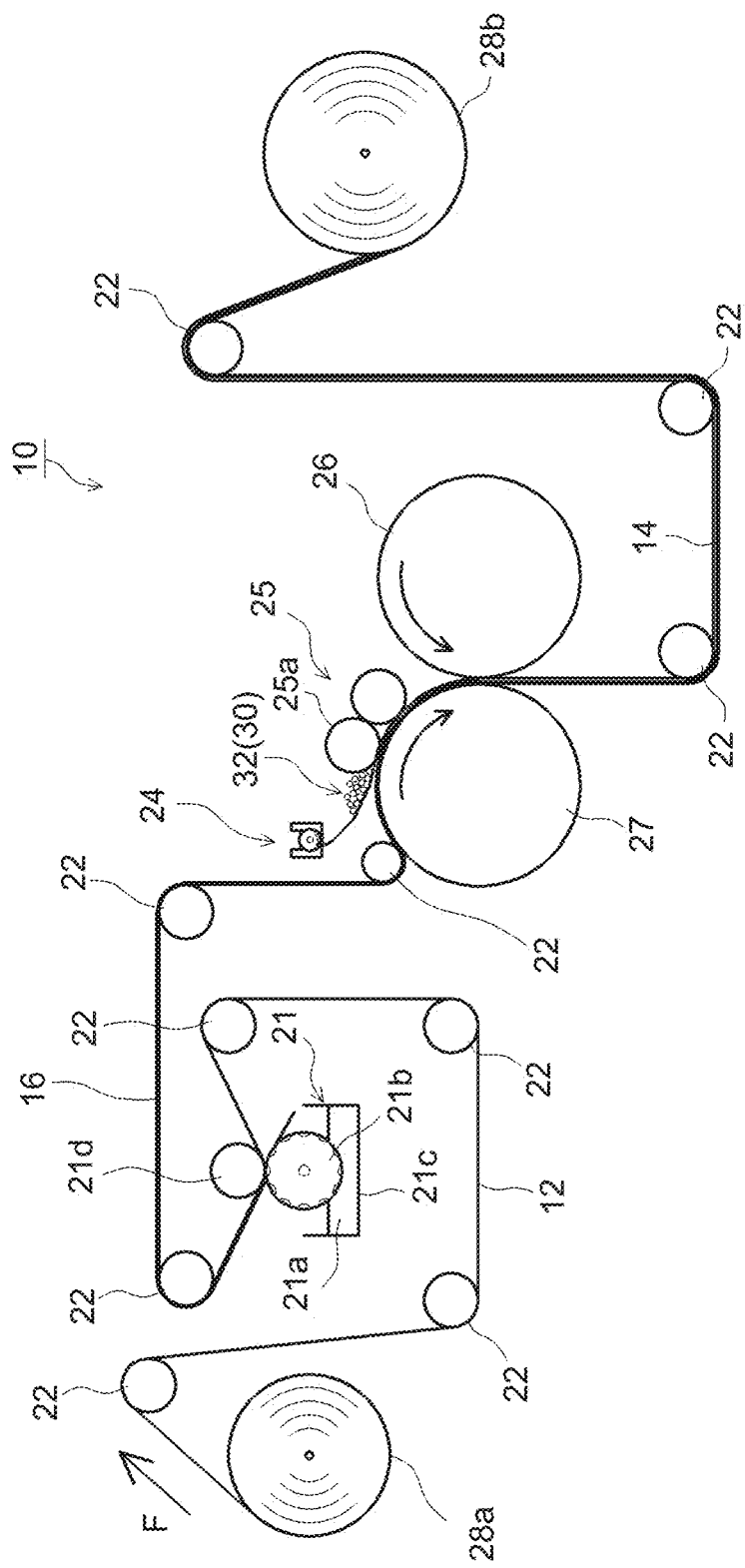
FIG. 1 is a schematic diagram illustrating a production apparatus of an electrode for lithium ion secondary batteries according to an embodiment.

Embodiments of a method for producing an electrode for lithium ion secondary batteries proposed herein will be explained next. Needless to say, the embodiments explained herein are not meant to limit the present invention in any particular way. The drawings are depicted schematically, and for instance dimensional relationships (length, width, thickness and so forth) in the drawings do not reflect actual dimensional relationships. In the present description, the term "secondary battery" denotes generally a battery that can be charged repeatedly. The term "lithium ion secondary battery" denotes a secondary battery which utilizes lithium ions as electrolyte ions and in which charge and discharge are achieved through transfer of electric charges accompanying lithium ions across the positive and negative electrodes.

First Embodiment

Figure 2:
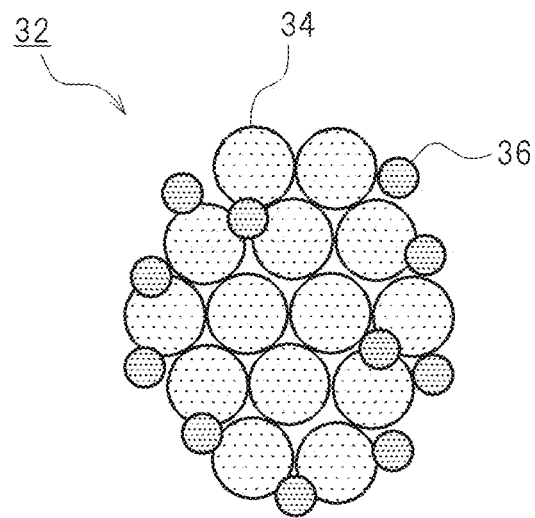
FIG. 2 is a diagram illustrating schematically granulated particles according to an embodiment.

The production method disclosed herein is a method for producing an electrode (positive electrode and negative electrode) having a structure in which an active material layer is held on an elongate collector. FIG. 1 is a schematic diagram illustrating a production apparatus 10 for implementing a method for producing an electrode according to an embodiment of the present invention. The production apparatus 10 can be used both in a positive electrode formation process and in a negative electrode formation process. As illustrated in FIG. 1, the production apparatus 10 is provided with transport parts 22, a binder liquid coating part 21, a granulated particle supply part 24, a squeegee member 25 and roll-pressing rollers 26, 27. The transport parts 22 are devices that transport a collector 12. The binder liquid coating part 21 is a device that applies a binder liquid 21a. The granulated particle supply part 24 is a device that supplies granulated particles 32. The various devices that make up the production apparatus 10 will be described below. FIG. 2 is a diagram illustrating schematically the granulated particles 32.

The electrode production process according to the present embodiment includes steps (a) through (e) below.
(a) binder coat layer formation step
(b) granulated particle supply step
(c) leveling step
(d) pressing step
(e) cutting step
  a. Binder Coat Layer Formation Step
  In step a, a binder coat layer 16 is formed through application of a binder liquid 21a, containing a binder and a solvent, onto an elongate collector 12, along the longitudinal direction of the latter.

The collector 12 is a member that draws electricity out of an electrode (positive electrode and negative electrode). For instance, materials having excellent electron conductivity and that are present stably inside a battery are used as the collector 12 that is utilized in a lithium ion secondary battery. Demands placed on such materials include for instance being lightweight, exhibiting the required mechanical strength, and being readily workable. In the example illustrated in FIG. 1, for instance a strip-like metal foil is prepared as the collector 12. The strip-like metal foil, as a collector foil, is prepared wound around a winding core.

To form a positive electrode of a lithium ion secondary battery, for instance, aluminum or an aluminum alloy is used as a positive electrode collector. The thickness of the positive electrode collector is not particularly limited, but is appropriately of about 5 μm to 30 μm, preferably of 10 μm to 20 μm (for instance 15 μm), in terms of achieving high strength and low resistance. To form a negative electrode of a lithium ion secondary battery, for instance copper or a copper alloy is used as the negative electrode collector. The thickness of the negative electrode collector is not particularly limited, but is appropriately of about 6 μm to 20 μm, preferably of 8 μm to 15 μm (for instance 10 μm), in terms of achieving high strength and low resistance.

In the production apparatus 10 illustrated in FIG. 1 the strip-like collector 12 described above is transported in the length direction. The elongate collector (metal foil) 12 is transported by the transport parts 22 along a transport path established beforehand. The arrow F in the figure denotes the transport direction. The transport parts 22 in the present embodiment are a plurality of transport rollers 22. As illustrated in FIG. 1, the elongate collector 12 is paid out from an unwinding part 28a in accordance with a roll-to-roll scheme, is subjected to a predetermined process while being transported by the plurality of transport rollers 22, and is taken up by a take-up part 28b.

The binder liquid 21a is a liquid resulting from dispersing or dissolving a binder in a solvent. A so-called aqueous solvent is suitably used as the solvent of the binder liquid 21a, in terms of mitigating environmental load. Water or a mixed solvent having water as a main component is used in this case. As solvent components other than water that make up such a mixed solvent there can be used, for instance, one or two or more organic solvents (lower alcohols, lower ketones or the like) that can be mixed uniformly with water. For instance, there is preferably used an aqueous solvent in which 80 mass % or more (more preferably 90 mass % or more, yet more preferably 95 mass % or more) of the aqueous solvent is water. A particularly preferred example is an aqueous solvent consisting substantially of water. The solvent of the binder liquid 21a is not limited to a so-called aqueous solvent, and may be a so-called organic solvent. Examples of organic solvents include for instance N-methyl pyrrolidone (NMP).

As the binder contained in the binder liquid 21a there is preferably used a polymer material that can be disperse or dissolve in the solvent that is utilized. Such a binder (first binder) may be for instance the same binder as the one utilized for producing the granulated particles 32, or may be a different binder. As an example, there can be preferably used for instance styrene butadiene rubber (SBR), polyacrylic acid (PAA) or the like, in the case of an aqueous solvent. In a case where an organic solvent is used, preferred examples for a binder include for instance polyvinylidene fluoride (PVDF), polyacrylic acid (PAA) and the like. In a preferred example of the binder liquid 21a, a mixture of SBR or an acrylic resin (for instance a polymethacrylic acid ester resin) as the binder with water as the solvent may be used for instance in the positive electrode of the lithium ion secondary battery. A mixture of SBR as the binder with water as the solvent may be used in the negative electrode of the lithium ion secondary battery.

The solids content of the binder liquid 21a may be about 20 mass % to 60 mass %, and preferably 30 mass % to 50 mass %, from the viewpoint of handleability and enhancing coatability.

In the present embodiment, for instance the binder liquid 21a may be applied onto the elongate collector 12 in accordance with a coating pattern established beforehand, along the longitudinal direction of the collector 12. The binder liquid 21a is applied onto a pre-set region on the collector 12. The binder liquid 21a may be applied for instance by gravure printing. For instance, a direct gravure roll coater may be used in the binder liquid coating part 21. In such a binder liquid coating part 21, the binder liquid 21a is transferred to the collector 12 by direct gravure utilizing a gravure roll 21b having a predetermined pattern shape carved on the surface. In the example illustrated in FIG. 1, the strip-like collector 12 is transported, with the treatment surface (surface on which the active material layer is to be formed) coated with the binder liquid 21a facing downward, and the gravure roll 21b is brought against the collector 12. The collector 12 is immersed into the binder liquid 21a stored in a reservoir 21c, under the gravure roll 21b. A back roller 21d is brought against the collector 12 on the reserve side of the side against which the gravure roll 21b stands. As a result, the binder liquid 21a stored in the reservoir 21c becomes continuously transferred to the collector 12 by way of the gravure roll 21b. A binder coat layer 16 corresponding to the pattern shape of the gravure roll 21b becomes formed on the collector 12 as a result of such transfer.

The thickness of the binder coat layer 16 is not particularly limited, and may be set for instance to 1 µm or more, preferably 2 µm or more, from the viewpoint of increasing the adhesiveness between the collector 12 and the active material layer 14. The thickness may be set for instance to 10 µm or less, preferably 5 µm or less, in terms of reducing resistance.

Figure 3:
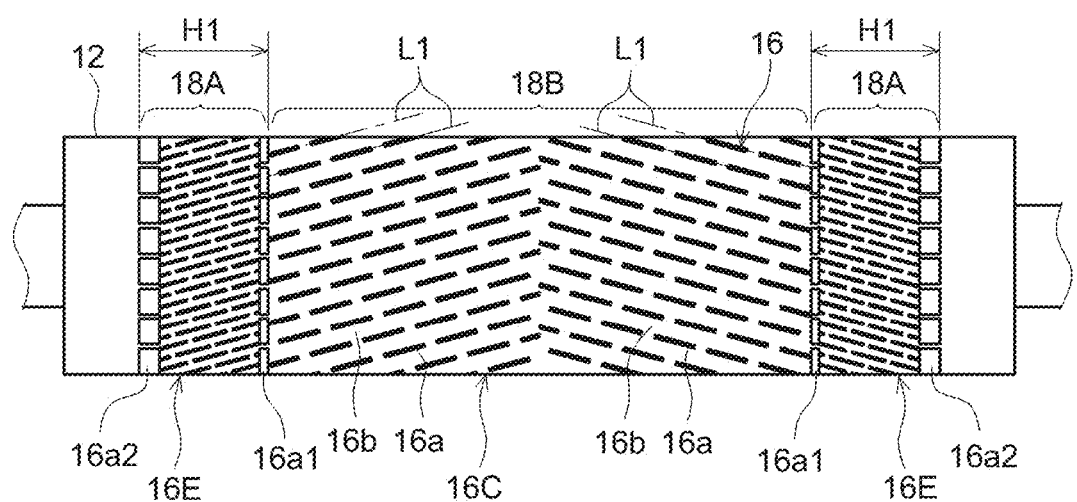
FIG. 3 is a diagram illustrating schematically a binder coat layer according to an embodiment.

FIG. 3 illustrates schematically the binder coat layer 16 formed on the collector 12. In the present embodiment, the binder coat layer 16 is formed on the collector 12 in such a manner that strip-like (including narrow line shapes; likewise hereafter) coated sections 16a resulting from coating with the binder liquid and strip-like uncoated sections 16b not coated with the binder liquid are alternately adjacent to each other, as illustrated in FIG. 3. Herein the strip-like coated sections 16a are formed along a plurality of lines (imaginary lines) L1 extending obliquely with respect to the width direction of the collector 12. The strip-like coated sections 16a are formed (resembling dashed lines) at given spacings from each other, along the plurality of lines L1.

The binder coat layer 16 is formed in such a manner that there are a large coat amount regions 18A where the coating amount (in terms of solids) of binder liquid per unit surface area is relatively large and a small coat amount region 18B in which the coating amount (in terms of solids) of the binder liquid per unit surface area is relatively small, in the width direction of the collector 12 perpendicular to the longitudinal direction of the latter. In the present embodiment, the large coat amount regions 18A are provided at both side edge portions 16E of the binder coat layer 16 in the width direction. The large coat amount regions provided at both side edge portions 16E of the binder coat layer 16 are referred to, as appropriate, as first large coat amount regions 18A. The small coat amount region 18B is provided at a portion 16C of the binder coat layer 16 other than the large coat amount regions 18A. Occurrences of peeling and slip-down (particle fall-off) of the active material at the edge portions of the active material layer after a pressing step can be mitigated by providing thus the first large coat amount regions 18A having a relatively large coating amount of the binder liquid, at both side edge portions 16E of the binder coat layer 16.

It suffices herein that the coating amount in the first large coat amount regions 18A be larger than the coating amount in the small coat amount region 18B. For instance, the coating amount in the first large coat amount regions 18A is appropriately set to be about 0.05 mg/cm$^2$ or greater (for instance, 0.05 mg/cm$^2$ to 0.2 mg/cm$^2$), and preferably 0.1 mg/cm$^2$ or greater (for instance 0.1 mg/cm$^2$ to 0.2 mg/cm$^2$). Particle fall-off at the active material layer edge portions can be yet better suppressed within such ranges of coating amount in the first large coat amount regions 18A. It suffices herein that the coating amount in the small coat amount region 18B be smaller than the coating amount in the first large coat amount regions 18A. For example, the coating amount in the small coat amount region 18B is appropriately set to be about 0.04 mg/cm$^2$ or smaller (for instance 0.02 mg/cm$^2$ to 0.04 mg/cm$^2$), and preferably 0.03 mg/cm$^2$ or smaller (for instance 0.02 mg/cm$^2$ to 0.03 mg/cm$^2$). Adhesiveness between the collector 12 and the active material layer can be increased, without an excessive increase in resistance, within such ranges of coating amount in the small coat amount region 18B. For example, preferably, the coating amount A in the first large coat amount regions 18A and the coating amount B in the small coat amount region 18B satisfy the relationship $A \geq 1.25B$, more preferably the relationship $A \geq 3B$ and yet more preferably the relationship $A \geq 5B$.

As illustrated in FIG. 3, in the binder coat layer 16 according to the present embodiment the width (length in the width direction) H1 of the first large coat amount regions 18A is appropriately 1 mm or greater. Particle fall-off at the active material layer edge portions can be yet better suppressed when the width H1 of the first large coat amount regions 18A is 1 mm or greater. The width H1 of the first large coat amount regions 18A in the binder coat layer 16 according to the present embodiment is preferably 2.5 mm or greater, more preferably 3 mm or greater. When the width H1 of the first large coat amount regions 18A is excessively large, on the other hand, there increases the amount of binder present at the interface of the collector and the active material layer, and electrode resistance may tend to increase as a result. The width H1 is preferably about 10 mm or smaller, preferably 8 mm or smaller, from the viewpoint of preventing increases in resistance. For instance, a binder coat layer 16 in which the width H1 of the first large coat amount regions 18A lies in the range of 1 mm to 10 mm (and further in the range of 2 mm to 5 mm) is appropriate herein in terms of both preventing particle fall-off and lowering resistance.

The coating amount in the first large coat amount regions 18A and the small coat amount region 18B can be adjusted as appropriate for instance through modification of the line width of the coated sections 16a and of the uncoated sections 16b, and through modification of the thickness (height) of the coated sections 16a. In the present embodiment the width of the uncoated sections 16b (pitch between coated sections 16a) in the first large coat amount regions 18A is smaller than that in the small coat amount region 18B. In other words, the exposed area ratio of the collector 12 is smaller in the first large coat amount regions 18A than in the small coat amount region 18B. In a preferred implementation, the exposed area ratio of the collector 12 in the first large coat amount regions 18A can be lower than about 20% (preferably 10% or lower, for instance in the range of 0% to 5%). In a preferred implementation, the entire surface of the first large coat amount regions 18A can be coated with the binder liquid (i.e. 0% exposed area ratio). The exposed area ratio of the collector 12 in the small coat amount region 18B can be about 20% or higher (preferably 25% or higher, for instance in the range of 20% to 30%).

The coating amount in the first large coat amount regions 18A may be set to be greater than that in the small coat amount region 18B by separately providing coated sections 16a1, 16a2 that are different from the strip-like coated sections 16a. In the example illustrated in FIG. 3, coated sections 16a1, 16a2 resembling dashed lines are provided along the longitudinal direction of the collector 12, at the edges of the first large coat amount regions 18A, on both sides in the width direction. The above-described effect of preventing particle fall-off can be elicited yet better by providing thus the coated sections 16a1, 16a2 at the edges of the first large coat amount regions 18A on both sides in the width direction.

b. Step of Supplying Granulated Particles

In step b granulated particles 32 are supplied onto the binder coat layer 16, as illustrated in FIG. 1. In the example illustrated in FIG. 1, the collector 12 is turned around by the transport rollers 22 and is transported up to the granulated particle supply part 24, with the surface having the binder coat layer 16 formed thereon facing upward. The granulated particles 32 are supplied by the granulated particle supply part 24.

As illustrated in FIG. 2, the granulated particles 32 that are supplied contain at least active material particles 34 and a binder 36 (second binder). Such granulated particles 32 can be of a form in which the binder 36 adheres of the surface of individual active material particles 34, and the active material particles 34 are bonded to each other by the binder 36. In a preferred implementation, the binder 36 is disposed dispersed substantially homogeneously, without exhibiting a locally uneven distribution, among and on the outer surface of the active material particles 34. The granulated particles 32 may contain a material other than the active material particles 34 and the binder 36, for instance a conductive material and/or a thickener.

Regarding the properties of the granulated particles, for instance an average particle size R of the particles may be about 50 μm or greater. The average particle size R of the granulated particles is preferably 60 μm or greater, more preferably 70 μm or greater, and yet more preferably 75 μm or greater, from the viewpoint of forming a homogeneous active material layer. The average particle size R of the granulated particles is about 120 μm or smaller, for instance 100 μm or smaller. The technology disclosed herein can be preferably realized in a form where for instance the average particle size of the granulated particles lies in the range of 50 μm to 120 μm.

In the present description, the term "average particle size" denotes, unless otherwise stated, a 50% volume average particle size, i.e. particle size at the 50% cumulative value in a particle size distribution measured on the basis of a particle size distribution measuring device relying on a laser scattering-diffraction method. The particle size at the 50% cumulative value, i.e. the 50% volume average particle size, will be referred to as "D50" as appropriate. More specifically, the term "average particle size" denotes herein the 50% volume average particle size in a dry measurement, without dispersion of particles in compressed air, using a particle size distribution measuring device of laser diffraction-scattering type (for instance, "Microtrac MT-3200II", by Nikkiso Co., Ltd.).

The granulated particles 32 can be prepared for instance through mixing of the active material particles 34 and the binder 36 at a predetermined proportion, and granulation, classification and so forth of the resulting mixture. The granulation method is not particularly limited, and for instance methods such as rolling granulation, fluidized bed granulation, stirring granulation, compression granulation, extrusion granulation, crushing granulation and spray drying (spray granulation) can be resorted herein. In a preferred example, a mix (suspension) resulting from mixing the active material particles 34 and the binder 36 in a solvent is granulated by spray drying. In the spray drying method the mix is sprayed into a dry atmosphere. The particles contained in each sprayed droplet become granulated in the form of about one lump. Accordingly, the solids content of the granulated particles 32 varies depending on the size of the droplets, as does for instance the size and mass of the granulated particles 32. The sprayed droplets may contain at least the active material particles 34 and the binder 36. The sprayed droplets may contain for instance a conductive material and a thickener.

When forming the positive electrode of the lithium ion secondary battery, various materials utilized conventionally as positive electrode active materials of lithium ion secondary batteries can be used herein, without particular limitations, as the positive electrode active material particles. Preferred examples include for instance oxides (lithium transition metal oxides) that contain lithium and transition metal elements as constituent metal elements, for example lithium nickel oxides (for instance $LiNiO_2$), lithium cobalt oxides (for instance $LiCoO_2$) and lithium manganese oxides (for instance $LiMn_2O_4$), as well as phosphates containing lithium and a transition metal element as constituent metal elements, for instance lithium manganese phosphate ($LiMnPO_4$), lithium iron phosphate ($LiFePO_4$) and the like. The average particle size (D50) of the positive electrode active material particles is not particularly limited, and is appropriately about 1 μm to 10 μm, preferably 4 μm to 6 μm.

To form the negative electrode of the lithium ion secondary battery various materials utilized conventionally as negative electrode active materials of lithium ion secondary batteries can be used herein, without particular limitations, as the negative electrode active material particles. Preferred examples include for instance carbon-based materials such as graphite carbon, amorphous carbon or the like, lithium transition metal oxides such as lithium titanate, lithium transition metal nitrides, silicon compounds and the like. The average particle size (D50) of the negative electrode active material particles is not particularly limited, and is appropriately about 10 μm to 30 μm, preferably 15 μm to 25 μm.

As the binder 36 contained in the granulated particles 32 there can be selected and used a material suitable for the granulation method that resorted to, from among various materials that allow realizing active material bonding. As an example, a polymer that can be dissolved or dispersed in a solvent is used in a case where a wet granulation method (for instance, the above the spray drying) is resorted to. Examples of polymers that can be dissolved or dispersed in an aqueous solvent include for instance acrylate polymers, rubbers (represented by styrene butadiene copolymer (SBR), acrylic acid-modified SBR resins (SBR latex)), vinyl acetate copolymers and the like. Examples of polymers that can be dissolved or dispersed in nonaqueous solvents include for instance polyvinylidene fluoride (PVDF). Cellulosic polymers, fluororesins (for instance polytetrafluoroethylene (PTFE)) or the like may be used as the binder 36 that is incorporated into the granulated particles 32.

In a configuration where a conductive material is to be incorporated, examples of the latter include for instance carbon materials as carbon powder, carbon fibers and the like. One type selected from among these conductive materials may be used singly; alternatively two or more types may be used concomitantly. As the carbon powder there can be used various types of carbon black, for instance acetylene black (AB), oil furnace black, graphitized carbon black, carbon black, ketjen black, graphite and the like. The above conductive material is suitably added in order to form conductive paths between the active material particles 34 and the collector 12 in a case where active material particles 34 of poor conductivity are used.

If the configuration is to include a thickener, examples of the latter encompass for instance materials such as carboxymethyl cellulose (CMC), a sodium salt of CMC (CMC-Na), polyvinyl alcohol (PVA), ethylene-vinyl alcohol copolymers (EVOH) and the like. One type selected from among these thickeners may be used singly; alternatively two or more types may be used concomitantly.

The granulated particle supply part 24 supplies the granulated particles 32 onto the binder coat layer that is formed on the collector 12 being transported by the transport parts 22. The granulated particle supply part 24 is provided with a hopper that stores the granulated particles 32. Although not illustrated in the figures, the hopper may be provided with an adjustment device for adjusting the supply amount of the granulated particles 32. In this case, the hopper may adjust the supply amount of the granulated particles 32 in accordance with for instance the transport speed of the collector 12, to supply an appropriate amount of the granulated particles 32 onto the binder coat layer 16 in a wet state. The granulated particles 32 are supplied in the form of aggregates (powder) 30 resulting from aggregation of a plurality of granulated particles 32.

c. Leveling Step

In step c, the granulated particles 32 having been supplied onto the binder coat layer 16 are leveled out by the squeegee member 25 that is brought against the granulated particles 32, as illustrated in FIG. 1. For instance, the thickness of the granulated particles 32 having been supplied onto the binder coat layer 16 (i.e. the thickness of the aggregates 30 of the granulated particles 32) is made uniform in this step. In the present embodiment the squeegee member 25 is provided downstream of the granulated particle supply part 24 (downstream in the transport path of the collector). The squeegee member 25 adjusts the thickness of granulated particles 32 having been supplied onto the binder coat layer 16. For instance, a gap is present between the squeegee member 25 and the collector 12 being transported, such that the thickness of the passing granulated particles 32 is adjusted according to this gap. In the present embodiment the squeegee member 25 is made up of a roller squeegee 25a and a back roller 27 (which functions also as a roll-pressing roller 27) disposed such that the granulated particles 32 supplied onto the collector 12 are sandwiched, in the thickness direction, between the roller squeegee 25a and the back roller 27. The roller squeegee 25a is herein a roll-like member, but may be a blade-like member. The gap between the roller squeegee 25a and the collector 12 depends also on the particle size and on the basis weight of the granulated particles 32, but may be adjusted for instance to lie in the range of about 100 µm to 300 µm (about 150 µm to 250 µm in a preferred example).

d. Pressing Step

In step d the active material layer 14 is formed on the collector 12 through pressing (rolling) of the granulated particles 32 supplied onto the binder coat layer 16. In the present embodiment, the roll-pressing rollers 26, 27 are members that sandwich the granulated particles 32 and the collector 12 in the transport path along which the strip-like collector 12 is transported. The gap between the roll-pressing rollers 26, 27 may be adjusted herein taking into consideration the thickness of the granulated particles 32 that are deposited on the collector 12. As a result, the granulated particles 32 are pressed against the collector 12, via the binder coat layer 16, with appropriate strength, and become fixed to the collector 12. At the same time there is increased the number of contact sites with the binder 36 in the granulated particles 32, so that the granulated particles 32 are brought into close contact with each other. The layer (active material layer 14) containing the active material particles 34 becomes formed as a result, to a substantially constant thickness, on the surface of the collector 12. Herein as illustrated in FIG. 1 to FIG. 3, the coating amount of binder liquid per unit surface area is relatively large in the first large coat amount regions 18A that are provided at both side edge portions 16E of the binder coat layer 16, and hence the granulated particles 32 become strongly fixed to the collector 12. In the first large coat amount regions 18A, the active material layer 14 becomes formed proportionally more compactly (at higher density) with increasing coating amount of the binder liquid. The contact sites with the binder 36 in the granulated particles 32 increase as a result, and the granulated particles 32 are strongly brought into close contact with each other. As a result, this allows mitigating the occurrence of peeling off the edge portions of the active material layer 14, and slip-down of the active material, after pressing.

e. Cutting Step

Figure 4:
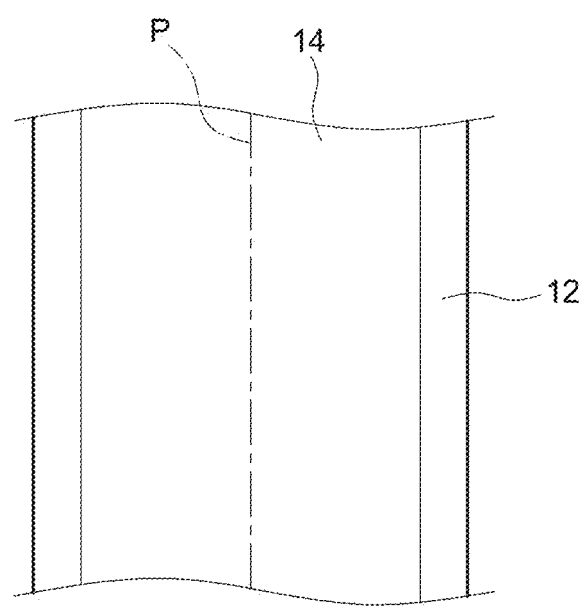
FIG. 4 is a diagram illustrating a cutting site of a collector and of an active material layer according to an embodiment.

After formation of the active material layer 14, in step e the collector 12 and the active material layer 14 are cut along the longitudinal direction, by a cutting device not shown, at the central portion in the width direction, to elicit separation into two electrode sheets. The dash-dotted line in FIG. 4 denotes a cutting site P at which the collector 12 and the active material layer 14 are cut (i.e. the position at which a slit is to be formed). The two divided electrode sheets are then subjected to subsequent processes. An electrode for lithium ion secondary batteries can thus be produced having a structure in which the active material layer 14 is held on the collector 12.

A method for producing an electrode for lithium ion secondary batteries according to an embodiment of the present invention has been explained above. A method for producing an electrode for lithium ion secondary batteries according to another embodiment of the present invention will be explained next.

Second Embodiment

Figure 5:
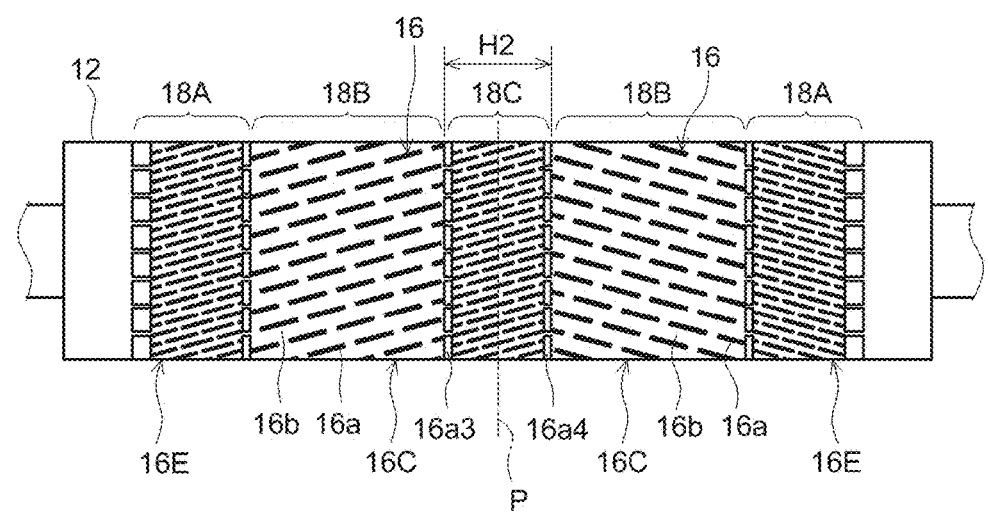
FIG. 5 is a diagram illustrating schematically a binder coat layer according to an embodiment.

Similarly to the first embodiment described above, a method for producing an electrode for lithium ion secondary batteries according to a second embodiment includes the following steps:
(a) binder coat layer formation step
(b) granulated particle supply step
(c) leveling step
(d) pressing step
(e) cutting step FIG. 5 illustrates schematically the binder coat layer 16 formed on the collector 12, in step a of forming the binder coat layer in the second embodiment. The dash-dotted line in FIG. 5 denotes a cutting site P intended for cutting in cutting step e. The second embodiment differs from the first embodiment in that now a large coat amount region of relatively large coating amount of binder liquid is provided at the cutting site P intended for cutting in the above cutting step e, as illustrated in FIG. 5, in addition to both side edge portions 16E (first large coat amount regions 18A) of the binder coat layer 16. The large coat amount region provided at the cutting site P may be referred to as second large coat amount region 18C as appropriate. Other features are identical to those of the first embodiment, and a recurrent explanation will be omitted herein.

The production method according to the second embodiment has a step of, after formation of the active material layer, cutting the active material layer and the collector along the longitudinal direction, at the central portion in the width direction. Significant stress acts on the active material layer during cutting in the cutting step e, and as a result the active material layer 14 becomes prone to peeling, and the active material to slip-down, at the cutting site. In a case where the binder coat layer 16 is formed intermittently, in particular, particle fall-off occurs readily since adhesion between the active material layer 14 and the collector 12 is weak at the uncoated sections 16b.

In the above configuration, by contrast, the second large coat amount region 18C having a relatively large coating amount of binder liquid is provided at the cutting site P intended for cutting in the cutting step e, so that, as a result, the granulated particles 32 contained in the cutting site become strongly fixed to the collector 12 during the pressing step. The active material layer 14 becomes formed proportionally more compactly (to a high density) with increasing coating amount of the binder liquid. The contact sites with the binder 36 in the granulated particles 32 increase as a result, and the granulated particles 32 are strongly brought into close contact with each other. As a result, this allows mitigating the occurrence of peeling of the active material layer 14 and the occurrence of slip-down of the active material at the cutting site during cutting.

It suffices herein that the coating amount in the second large coat amount region 18C be larger than the coating amount in the small coat amount region 18B. For instance, the coating amount of in the second large coat amount region 18C is appropriately set to be about 0.05 mg/cm$^2$ or greater (for instance, 0.05 mg/cm$^2$ to 0.2 mg/cm$^2$), and preferably 0.1 mg/cm$^2$ or greater (for instance 0.1 mg/cm$^2$ to 0.2 mg/cm$^2$). Particle fall-off at the cutting site can be yet better suppressed within such ranges of the coating amount in the second large coat amount region 18C.

In the binder coat layer 16 according to the present embodiment the width (length in the width direction) H2 of the second large coat amount region 18C is appropriately 1 mm or greater, as illustrated in FIG. 5. When the width H2 of the second large coat amount region 18C is 1 mm or greater, there can be secured sufficient cutting margin for forming a slit (breaks). As a result, it becomes possible to form reliably a slit in the second large coat amount region 18C, even if the collector 12 being transported becomes misaligned in the width direction. The width H2 of the first large coat amount regions 18A in the binder coat layer 16 according to the present embodiment is preferably 2.5 mm or greater, more preferably 3 mm or greater. When the width H2 of the second large coat amount region 18C is excessively large, on the other hand, there increases the amount of binder present at the interface of the collector and the active material layer, and electrode resistance may tend to increase as a result. The width H1 is preferably about 10 mm or smaller, preferably 8 mm or smaller, from the viewpoint of preventing increases in resistance.

The coating amount in the second large coat amount region 18C can be adjusted as appropriate for instance through modification of the line width of the coated sections 16a and of the uncoated sections 16b, and through modification of the thickness (height) of the coated sections 16a. In the present embodiment the width (pitch between coated sections 16a) of the uncoated sections 16b in the second large coat amount region 18C is smaller than that in the small coat amount region 18B. In other words, the exposed area ratio of the collector 12 is smaller in the second large coat amount region 18C than in the small coat amount region 18B. In a preferred implementation, the exposed area ratio of the collector 12 in the second large coat amount region 18C can be about 10% or lower (8% or lower, and more preferably 5% or lower). In a preferred implementation, the entire surface of the second large coat amount region 18C can be coated with the binder liquid (i.e. exposed area ratio of 0%). Particle fall-off at the cutting site can be effectively avoided by reducing thus the exposed area ratio of the collector 12 in the second large coat amount region 18C.

The coating amount of in the second large coat amount region 18C may be set to be greater than that in the small coat amount region 18B by separately providing coated sections 16a3, 16a4 that are different from the strip-like coated sections 16a. In the example illustrated in FIG. 5, coated sections 16a3, 16a4 resembling dashed lines are provided along the longitudinal direction of the collector 12, at the edges of the second large coat amount region 18C, on both sides in the width direction. The above-described effect of preventing particle fall-off can be elicited yet better by providing the coated sections 16a3, 16a4 at the edges of the second large coat amount region 18C on both sides in the width direction.

Lithium Ion Secondary Battery

Figure 6:
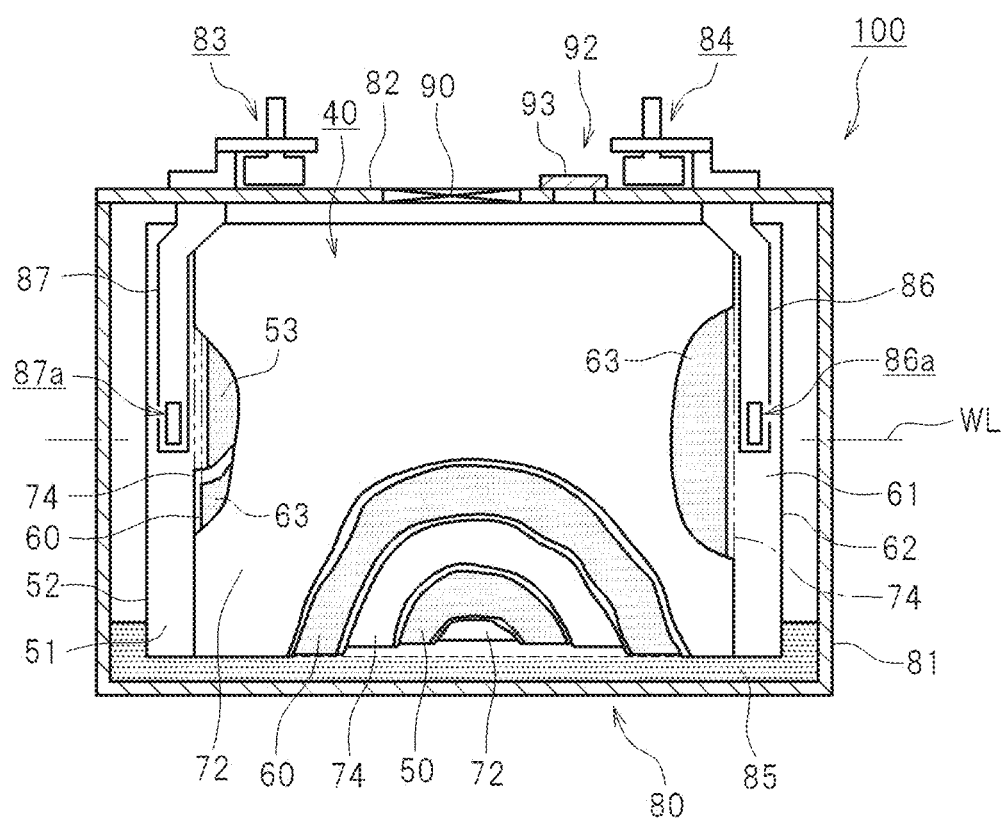
FIG. 6 is a diagram illustrating schematically a lithium ion secondary battery according to an embodiment.
Figure 7:
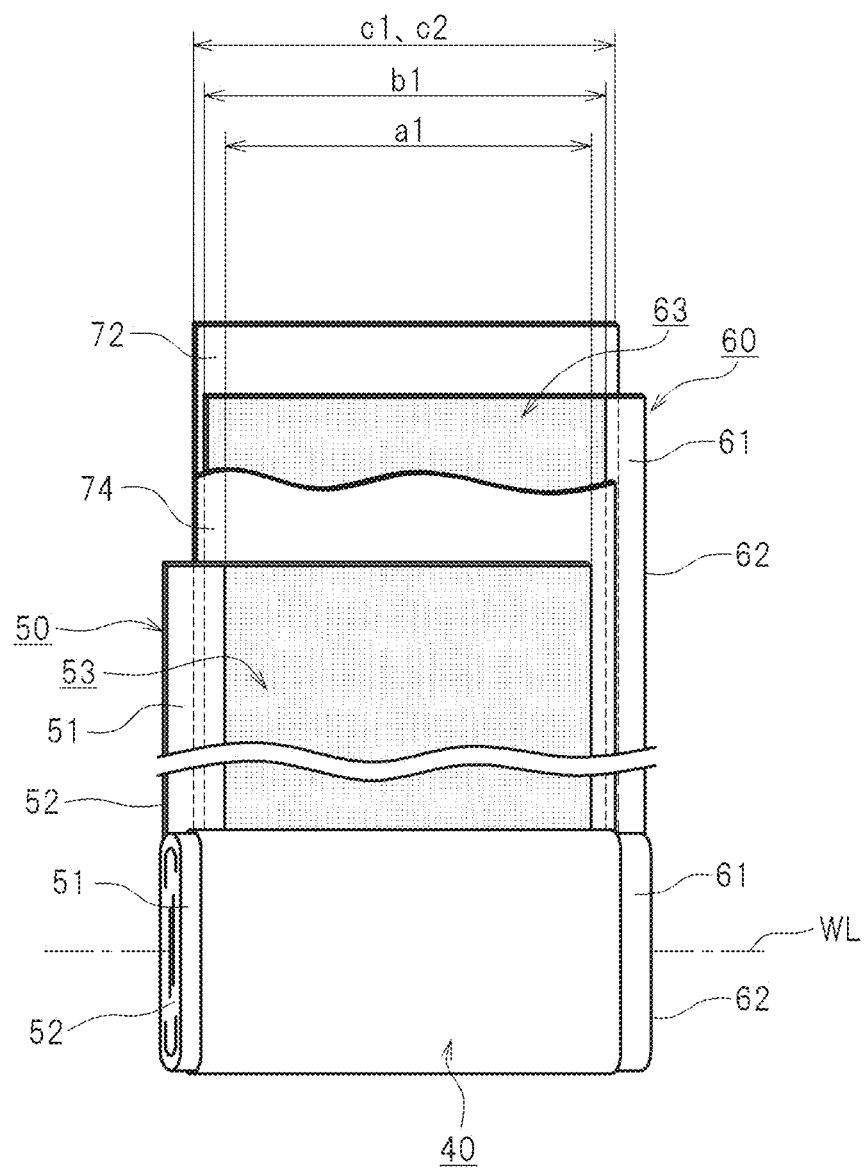
FIG. 7 is a diagram for explaining a wound electrode body according to an embodiment.

An embodiment of a lithium ion secondary battery constructed using a negative electrode (negative electrode sheet) and a positive electrode (positive electrode sheet) formed utilizing the production apparatus 10 described above will be explained next with reference to the schematic diagrams illustrated in FIG. 6 and FIG. 7. FIG. 6 is a cross-sectional diagram of a lithium ion secondary battery 100 according to an embodiment of the present invention. FIG. 7 is a diagram illustrating an electrode body 40 that is built into the lithium ion secondary battery 100. A positive electrode (positive electrode sheet) 50 produced utilizing the production apparatus 10 described above is used in as the positive electrode (positive electrode sheet) 50 of the lithium ion secondary battery 100. A negative electrode (negative electrode sheet) 60 produced utilizing the production apparatus 10 described above is used as the negative electrode (negative electrode sheet) 60.

The lithium ion secondary battery 100 according to an embodiment of the present invention is made up of a flat square battery case (i.e. outer container) 80 such as the one illustrated in FIG. 6. A flat wound electrode body 40 is accommodated, together with a liquid electrolyte (electrolyte solution) 85, inside the battery case 80 of the lithium ion secondary battery 100, as illustrated in FIG. 6 and FIG. 7.

The battery case 80 is made up of a box-like (i.e. a bottomed rectangular parallelepiped) case body 81 having an opening at one end (corresponding to a top end during normal use of the battery 100), and a lid body (sealing plate) 82, made up of a rectangular plate member, attached to the above opening plugging the latter. The material of battery case 80 is not particularly limited, and may be identical to those used in conventional lithium ion secondary batteries. Preferred herein is a battery case 80 configured mainly out of a metallic material that is lightweight and has good thermal conductivity. Examples of such metallic materials include aluminum and the like.

As illustrated in FIG. 6, the lid body 82 has formed thereon a positive electrode terminal 83 and a negative electrode terminal 84 for external connection. A thin-walled safety valve 90 configured so as to relieve internal pressure in the battery case 80 when the internal pressure becomes equal to or higher than a predetermined level, and a filling inlet 92, are formed between the terminals 83, 84 of the lid body 82. In FIG. 6 the filling inlet 92 is sealed by a sealing material 93, after liquid filling.

As illustrated in FIG. 7, the wound electrode body 40 is provided with a total of two elongate sheet-shaped separators (separators 72, 74), namely an elongate sheet-shaped positive electrode (positive electrode sheet 50) and an elongate sheet-shaped negative electrode (negative electrode sheet 60) similar to the positive electrode sheet 50.

As illustrated in FIG. 7, the positive electrode sheet 50 is provided with a strip-like positive electrode collector 52 and a positive electrode active material layer 53. A positive electrode active material layer non-formation section 51 is set along an edge section of the positive electrode collector 52 on one side in the width direction. In the example illustrated in the figures, the positive electrode active material layer 53 is held on both faces of the positive electrode collector 52, excluding the positive electrode active material layer non-formation section 51 set on the positive electrode collector 52. In a case where the positive electrode active material layer 53 is to be formed on both faces of the positive electrode collector 52, there may be formed a positive electrode active material layer 53 in accordance with the production method described above on one face of the positive electrode collector 52, followed by formation of a positive electrode active material layer 53, in accordance with the production method described above, on the other face of the positive electrode collector 52.

The negative electrode sheet 60 is provided with a strip-like negative electrode collector 62 and a negative electrode active material layer 63. A negative electrode active material layer non-formation section 61 is set along an edge section of the negative electrode collector 62 on one side in the width direction. The negative electrode active material layer 63 is held on both faces of the negative electrode collector 62, excluding the negative electrode active material layer non-formation section 61 set on the negative electrode collector 62. In a case where the negative electrode active material layer 63 is to be formed on both faces of the negative electrode collector 62, there may be formed a negative electrode active material layer 63 in accordance with the production method described above on one face of the negative electrode collector 62, followed by formation of a negative electrode active material layer 63, in accordance with the production method described above, on the other face of the negative electrode collector 62.

As illustrated in FIG. 7, the separators 72, 74 are members that separate the positive electrode sheet 50 and the negative electrode sheet 60 from each other. In the present example, the separators 72, 74 are made up of a strip-like sheet material, of predetermined width, having a plurality of small holes. For instance separators having a single-layer structure or multilayer structure and made up of a porous polyolefin resin can be used herein as the separators 72, 74. A layer of particles having insulating properties may be further formed on the surface of a sheet material made up of such a resin. The insulating particles may be made up of an insulating inorganic filler (for instance, a filler such as a metal oxide, a metal hydroxide or the like), or may be made up of insulating resin particles (for instance, particles of polyethylene, polypropylene or the like). In the present example, as illustrated in FIG. 7, the width b1 of the negative electrode active material layer 63 is slightly larger than the width a1 of the positive electrode active material layer 53. The widths c1, c2 of the separators 72, 74 are slightly larger than the width b1 of the negative electrode active material layer 63 (c1, c2>b1>a1).

To produce the wound electrode body 40, the positive electrode sheet 50 and the negative electrode sheet 60 are laid up on each other with the separators 72, 74 interposed therebetween. The positive electrode active material layer non-formation section 51 of the positive electrode sheet 50 and the negative electrode active material layer non-formation section 61 of the negative electrode sheet 60 are laid up so as to jut beyond respective sides of the separators 72, 74, in the width direction. The resulting stack thus laid up is then wound, and the obtained wound body is subsequently squashed from the sides; the flat wound electrode body 40 can be produced thereby. In the present embodiment the wound electrode body 40 is pressed and bent, to a flat shape, in a direction perpendicular to the winding axis WL, as illustrated in FIG. 7. In the example illustrated in FIG. 7, the positive electrode active material layer non-formation section 51 of the positive electrode sheet 50 and the negative electrode active material layer non-formation section 61 of the negative electrode sheet 60 are spirally exposed at both sides of the respective separators 72, 74. In the present embodiment, as illustrated in FIG. 6, the intermediate portion of the positive electrode active material layer non-formation section 51 is brought together and is welded to power collection tabs 87, 86 of electrode terminals (inner terminals) disposed inside the battery case 80. The reference symbols 87a, 86a in FIG. 6 denote the above welding sites.

A nonaqueous electrolyte solution identical to those conventionally used in lithium ion secondary batteries can be used herein, without particular limitations, as the electrolyte solution (nonaqueous electrolyte solution) 85. Such a nonaqueous electrolyte solution has typically a composition in which a supporting salt is incorporated into an appropriate nonaqueous solvent. As the nonaqueous solvent there can be used for instance one or two or more solvents selected from the group consisting of ethylene carbonate, propylene carbonate, dimethyl carbonate, diethyl carbonate, ethyl methyl carbonate, 1,2-dimethoxyethane, 1,2-diethoxyethane, tetrahydrofuran, 1,3-dioxolane and the like. A lithium salt such as $LiPF_6$, $LiBF_4$, $LiAsF_6$, $LiCF_3SO_3$, $LiC_4F_9SO_3$, $LiN(CF_3SO_2)_2$, $LiC(CF_3SO_2)$ or the like can be used as the supporting salt.

The sealing process of the case 80 and the process of arranging (pouring) electrolyte solution are not characterizing features of the present invention, and can be implemented in accordance with methods identical to those resorted to in the production of conventional lithium secondary batteries.

The lithium ion secondary battery 100 thus constructed is provided with the positive electrode 50 and negative electrode 60 that are not prone to particle fall-off, and hence the lithium ion secondary battery 100 can exhibit excellent battery performance. For instance, such a lithium ion secondary battery 100 can satisfy at least one characteristic (preferably all characteristics) from among excellent cycle characteristics, excellent input-output characteristics, and excellent production stability.

Various examples pertaining to the present invention will be explained below, but the invention is not meant to be limited to any of the features illustrated in such examples. Herein there were produced positive electrode sheets for a lithium ion secondary battery, and the presence or absence of a positive electrode active material layer was evaluated.

Example

Positive electrode sheets were produced as follows. A preparation solution for positive electrode granulated particle formation was prepared through addition, to a planetary disperser, of a $LiNi_{1/3}Co_{1/3}Mn_{1/3}O_2$ powder (average particle size: 4 μm to 5 μm) as a positive electrode active material, AB as a conductive material, an acrylate polymer as a binder, CMC-Na as a thickener, and LEOCOL (registered trademark by Lion Corporation) as a surfactant, together with water, with homogeneous mixing of the whole. The preparation solution was sprayed to remove the solvent in a droplet state, with drying, to obtain a powder of positive electrode granulated particles having an average particle size of 75 μm.

Next, SBR as a binder was dispersed in water to prepare a binder liquid (solids content: 40 mass %). Using a production apparatus such as the one illustrated in FIG. 1 the binder liquid was pattern-coated, by gravure printing, onto the positive electrode collector (herein there was used 15 μm thick aluminum foil), to form thereby a binder coat layer. The binder coat layer was formed intermittently on the positive electrode collector in such a manner that the strip-like coated sections 16a resulting from coating with the binder liquid and the strip-like uncoated sections 16b not coated with the binder liquid were alternately adjacent to each other. Herein the binder liquid was applied onto the entire surface of both side edge portions 16E of the binder coat layer 16 in the width direction, to form the first large coat amount regions 18A. The coating amount in the first large coat amount regions 18A was set to 0.2 $mg/cm^2$ (in terms of solids) and the width H1 (FIG. 3) was set to 2 mm. Further, the binder liquid was applied onto the entire surface of the central portion (site intended for cutting) of the binder coat layer 16 in the width direction, to form the second large coat amount region 18C. The coating amount of in the second large coat amount region 18C was set to 0.2 $mg/cm^2$ (in terms of solids) and the width H2 (FIG. 5) was set to 2 mm. The region other than the first large coat amount regions 18A and the second large coat amount region 18C served as the small coat amount region 18B. The coating amount (in terms of solids) in the small coat amount region 18B was set to 0.04 $mg/cm^2$.

Next, the positive electrode granulated particles ware supplied onto the binder coat layer. The particles were leveled out by the roller squeegee standing against the latter, and thereafter the resulting aggregates of positive electrode granulated particles were pressed, to form a positive electrode active material layer. After formation of the positive electrode active material layer, the central portion of the positive electrode collector and the positive electrode active material layer was cut through formation of a slit in the central portion, in the width direction, to bring about division into two positive electrode sheets. As a result there were obtained positive electrode sheets in which the positive electrode active material layer was held on one face of the respective positive electrode collector.

Comparative Example

For comparison, there was formed a binder coat layer without providing the first large coat amount regions 18A or the second large coat amount region 18C (i.e. with the small coat amount region 18B as the entire area of the binder coat layer). A positive electrode sheet was obtained in accordance with the same procedure as that of the example, except that the first large coat amount regions 18A and the second large coat amount region 18C were not provided.

Figure 8:
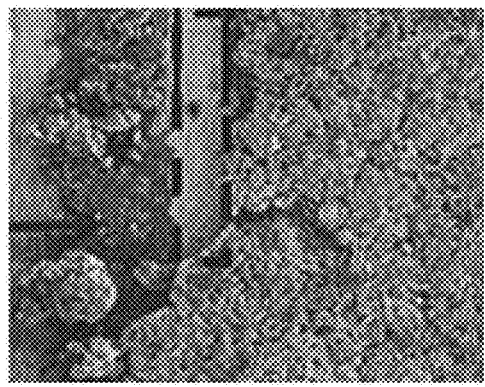
FIG. 8 is a SEM image of a positive electrode active material layer according to a comparative example, captured from above.

The occurrence or absence of peeling of the positive electrode active material layer at the cutting site of the positive electrode collector and the positive electrode active material layer in the positive electrode sheets of the example and the comparative example was checked visually. FIG. 8 is a SEM image of the positive electrode active material layer of the comparative example captured from above. As depicted in FIG. 8, it was found that part of the positive electrode active material layer in the comparative example had peeled at the cutting site. By contrast, almost no peeling of the positive electrode active material layer at the cutting site was observed in the example, in which the second large coat amount region 18C was provided at the cutting site.

Figure 9:
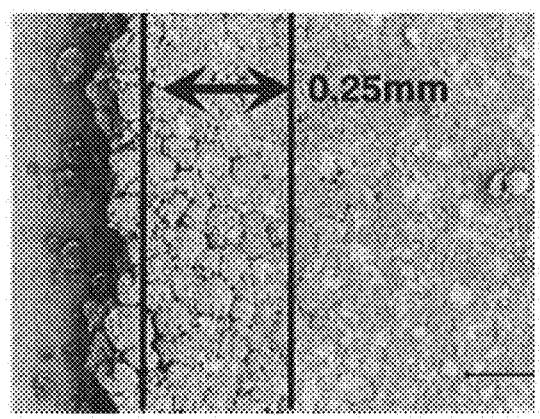
FIG. 9 is a SEM image of a positive electrode active material layer according to an example, captured from above.
Figure 10:
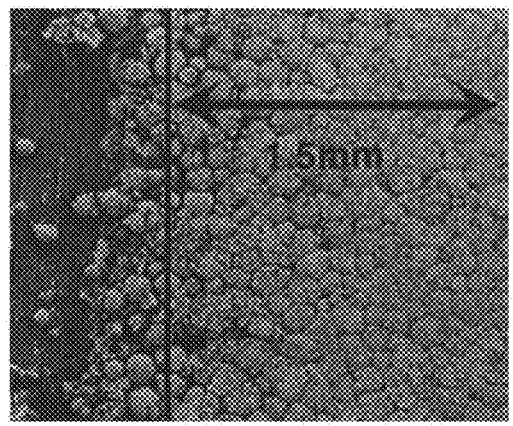
FIG. 10 is a SEM image of a positive electrode active material layer according to a comparative example, captured from above.

The occurrence or absence of peeling at the edge portions of the positive electrode active material layer was visually observed for the positive electrode sheets of the example and the comparative example. FIG. 9 is a SEM image of an edge portion of the positive electrode active material layer of the example, captured from above. FIG. 10 is a SEM image of an edge portion of the positive electrode active material layer of the comparative example, captured from above. As depicted in FIG. 10, significant peeling and particle fall-off were observed at the edge portion of the positive electrode active material layer of the comparative example. The width of the portion (low-density area) at which the above peeling and particle fall-off occurred was measured to be of about 1.5 mm. In the example, where the first large coat amount regions 18A were provided at both side edge portions of the binder coat layer, peeling and particle fall-off at the edge portions exhibited an improvement with respect to the comparative example. The width of the portion (low-density area) at which the above peeling and slip-down occurred was measured to be of about 0.25 mm.

The adhesion of the edge portions of the positive electrode active material layer with the positive electrode collector in the positive electrode sheets of the example and the comparative example was also evaluated. Specifically, the interface of the edge portions of the positive electrode active material layer and the collector of the positive electrode sheet of each example was cut at a constant speed using a peel strength measuring device (SAICAS), and the peel strength at the interface between the collector and the edge portions of the positive electrode active material layer was measured on the basis of the horizontal-direction force necessary for cutting. The results revealed that the peel strength was 0.31 kN/m in the comparative example and 0.55 kN/m in the example. It was thus found that the adhesion between the edge portions of the positive electrode active material layer and the positive electrode collector was better in the example than in the comparative example.

The method for producing an electrode for lithium ion secondary batteries proposed herein has been explained above. Unless otherwise stated, the method for producing an electrode for lithium ion secondary batteries according to the present invention is however not limited to the embodiments described above.

For instance, the binder coat layer 16 in the first embodiment and second embodiment described above is formed intermittently on the collector 12, but the present invention is not limited thereto. The binder coat layer 16 can be formed on the entire surface of the collector 12 (typically the entire surface of the region on which the active material layer is to be formed). In this case, the coating amount in the first large coat amount regions 18A and in the small coat amount region 18B may be adjusted through modification of the thickness of the binder coat layer 16 at the foregoing regions. For instance, the thickness of the binder coat layer 16 may be established so that the first large coat amount regions 18A are thicker than the small coat amount region 18B. The same effect as described above can be achieved in such a configuration. In a case where binder coat layer 16 is applied onto the entire surface, the binder coat layer 16 may further contain a conductive material (for instance, carbon black). As in the embodiments described above, however, intermittent formation of the binder coat layer 16 is preferable in terms of lowering battery resistance.

In the examples illustrated in FIG. 3 and FIG. 5, the coated sections 16a of the binder coat layer 16 are formed along a plurality of lines (imaginary lines) L1 extending obliquely on the collector 12. The coating pattern of the binder coat layer 16 is not limited to this pattern. For instance, the coated sections 16a may be formed along a plurality of lines that extend in the longitudinal direction of the collector 12. Alternatively, the coated sections 16a may be formed along lines that cross the collector 12 in a zig-zag fashion. The same effect as described above can be elicited in this case as well. However, it is preferable to form the coated sections 16a along the plurality of lines L1 that extend obliquely on the collector, as in the embodiments described above, in terms of enhancing basis weight precision.

The electrode production method in the first embodiment and the second embodiment has a leveling step, but such a leveling step may be omitted. The electrode production method in the first embodiment has a cutting step, but such a cutting step may be omitted. For instance, the binder coat layer 16 may be formed on the collector 12, leaving a band on only one edge section of the collector 12 in the width direction. Further, the granulated particles may be supplied onto the binder coat layer 16, leaving a band on only one edge section of the collector 12 in the width direction. In this case an electrode can be produced omitting the cutting step.

The lithium ion secondary battery provided with an electrode produced in accordance with the production method proposed herein is provided with an electrode of stable high quality and not prone to exhibiting slip-down of active material. Accordingly, the battery is preferably used in applications that demand stable high performance. Such applications include for instance power sources (drive power sources) for motors that are installed in vehicles. The type of vehicle is not particularly limited herein, and includes for instance plug-in hybrid vehicles (PHV), hybrid vehicles (HV), electric vehicles (EV), electric trucks, motorized bicycles, electrically assisted pedal cycles, electric wheelchairs, electric railways and the like. The lithium ion secondary battery may be used in the form of an assembled battery resulting from connecting a plurality of the lithium ion secondary batteries in series and/or in parallel.

INDUSTRIAL APPLICABILITY

The present invention allows providing a method for producing an electrode for lithium ion secondary batteries in which slip-down of active material is suppressed.

The invention claimed is:

1. A method for producing an electrode for lithium ion secondary batteries, the method comprising:
    a step of forming a binder coat layer through application of a binder liquid containing a binder and a solvent, onto an elongate collector, along a longitudinal direction of the collector,
        wherein the binder coat layer has a large coat amount region in which a coating amount of the binder liquid per unit surface area is relatively large and a small coat amount region in which a coating amount of the binder liquid per unit surface area is relatively small, in a width direction of the collector perpendicular to the longitudinal direction of the collector, and
        the large coat amount region is provided at least at both side edge portions of the binder coat layer in the width direction and comprises coated sections forming dashed lines along a plurality of lines extending obliquely with respect to the width direction of the collector;
    a step of supplying granulated particles containing active material particles and a binder, onto the binder coat layer; and
    a step of forming an active material layer through pressing of aggregates of the granulated particles having been supplied onto the binder coat layer.

2. The production method according to claim 1, further comprising a step of, after formation of the active material layer, cutting the active material layer and the collector along the longitudinal direction, at a central portion in the width direction,
    wherein the large coat amount region of the binder coat layer is provided at a cutting site intended for cutting in the cutting step.

3. The production method according to claim 1, wherein the binder coat layer is formed intermittently on the collector,
    the binder coat layer comprises strip-like coated sections resulting from coating with the binder liquid and strip-like uncoated sections not coated with the binder liquid, and
    the strip-like coated sections and the strip-like uncoated sections are alternately adjacent to each other.

* * * * *